United States Patent
Vikberg et al.

(10) Patent No.: US 8,666,407 B2
(45) Date of Patent: Mar. 4, 2014

(54) FEMTOCELL BASE STATION, METHOD, COMPUTER PROGRAM AND COMPUTER PROGRAM PRODUCT

(75) Inventors: Jari Vikberg, Järna (SE); Karl-Peter Ranke, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 384 days.

(21) Appl. No.: 13/264,080

(22) PCT Filed: Sep. 9, 2011

(86) PCT No.: PCT/SE2011/051094
§ 371 (c)(1),
(2), (4) Date: Oct. 12, 2011

(87) PCT Pub. No.: WO2013/025136
PCT Pub. Date: Feb. 21, 2013

(65) Prior Publication Data
US 2013/0045732 A1   Feb. 21, 2013

Related U.S. Application Data

(60) Provisional application No. 61/523,692, filed on Aug. 15, 2011.

(51) Int. Cl.
*H04W 4/00* (2009.01)

(52) U.S. Cl.
USPC ............... 455/435.1; 455/433; 455/435.2; 455/439; 455/442; 455/444

(58) Field of Classification Search
USPC .................................. 455/422.1, 428–444
See application file for complete search history.

(56) References Cited

U.S. PATENT DOCUMENTS

| | | | |
|---|---|---|---|
| 2003/0211857 A1* | 11/2003 | Afshartous et al. | 455/502 |
| 2011/0261960 A1* | 10/2011 | Cho et al. | 380/270 |
| 2012/0177018 A1* | 7/2012 | Abraham et al. | 370/338 |
| 2012/0207077 A1* | 8/2012 | Iwai et al. | 370/312 |
| 2013/0005347 A1* | 1/2013 | Curticapean | 455/456.1 |
| 2013/0016841 A1* | 1/2013 | Fong et al. | 380/287 |
| 2013/0083762 A1* | 4/2013 | Adachi et al. | 370/329 |
| 2013/0136085 A1* | 5/2013 | Ogawa et al. | 370/329 |
| 2013/0250915 A1* | 9/2013 | Ohta et al. | 370/331 |

FOREIGN PATENT DOCUMENTS

| | | |
|---|---|---|
| WO | 2007136339 A2 | 11/2007 |
| WO | 2008037804 A1 | 4/2008 |

* cited by examiner

*Primary Examiner* — Dai A Phuong
(74) *Attorney, Agent, or Firm* — Coats & Bennett, PLLC (57) ABSTRACT

It is presented a method for a femtocell base station, for facilitating communication between a communication terminal and a core network. The method comprises the steps, performed in the femtocell base station, of: sending a first femtocell base station message to the communication terminal; receiving a first terminal message from the communication terminal, the first terminal message comprising a first sequence number; and repeatedly sending further femtocell base station messages to the communication terminal and receiving corresponding terminal messages, comprising incremented sequence numbers, from the communication terminal, such that an expected next terminal message from the communication terminal comprises a sequence number being equal to the first sequence number. A corresponding femtocell base station, computer program and computer program product are also presented.

20 Claims, 3 Drawing Sheets

FEMTOCELL BASE STATION, METHOD, COMPUTER PROGRAM AND COMPUTER PROGRAM PRODUCT

TECHNICAL FIELD

The invention relates to a femtocell base station, and a method of a femtocell base station, for facilitating communication between a communication terminal and a core network.

BACKGROUND

Femtocell base stations are known in different communication standards. For instance, the 3GPP (3rd Generation Partnership Project) standard with specification number 3GPP TS 25.467 v 10.2.0 describes the UTRAN (Universal Terrestrial Radio Access Network) architecture for femtocell for 3G (3rd Generation) Home Node B (HNB).

Specifically, the 3GPP TS 25.467 standard specification describes a UE (User Equipment) registration function as "The UE Registration Function for HNB provides means for the HNB to convey UE identification data to the HNB GW in order to perform access control or membership verification for the UE in the HNB GW. The UE Registration also informs the HNB GW of the specific HNB where the UE is located."

According to the standard, UE registration is performed by the HNB and the HNB registers a specific UE with the HNB GW. The registration is triggered when the UE attempts to access the HNB via an initial NAS (Non-Access Stratum) message over the Uu interface (e.g., Location Updating Request) and there is no context in the HNB allocated for that UE.

Chapter 5.1.2 of the same standard describes the case where a HNB registers a UE in the HNB GW when either the UE or the HNB, or both, do not belong to a CSG (Closed Subscriber Group). A CSG is a list of UEs which are allowed to have access to the HNB. The list can be maintained either in the HNB or HNB GW or in the Core Network (CN), and it may comprise for example the CSG Identity (CSG-ID) of the CSG and the IMSIs (International Mobile Subscriber Identities) of the UEs allowed to access the CSG. In this case, the standard describes the option that the HNB may in certain cases fetch the identity of the subscriber with a NAS Identity Request procedure before registering the subscriber in the HNB GW. This step consists of a NAS Identity Request message sent by the HNB, and a NAS Identity Response message sent by the UE as a reply, containing the subscriber identity (IMSI).

A problem with the existing standard as described above is that the HNB uses a NAS message to fetch the identity of the subscriber. However, NAS messages are defined to be exchanged between the CN (Core Network) and the UE (User Equipment), and they are standardized in 3GPP TS 24.008.

The NAS messages contain a sequence number, N(SD), that allows the CN to detect duplicated NAS messages sent by the UE. NAS messages may be duplicated by the Data Link layer in some cases, for example at channel change before the last layer 2 frame has been acknowledged by the peer. The NAS sequence number mechanism is described in 3GPP TS 24.007, chapter 11.2.3.2.3 and subchapters. The first NAS message is sent by the UE with sequence number '0'. The CN will receive this first NAS message with sequence number '0' in an RANAP (Radio Access Network Application Part) Initial UE message. However, when the HNB fetches the subscriber identity with a NAS Identity Request message, this will cause the UE to increment the sequence number and reply with a NAS Identity Response with sequence number '1'. This will result in the CN discarding further NAS messages sent by the UE to the CN, since the next NAS message to the CN will contain the sequence number '2', but the CN expects the next NAS message to have the sequence number '1' according to TS 24.007. Thus, the Location Update in the CN will fail in certain cases, for example if the CN tries to authenticate the subscriber with a NAS Authentication Request, since the CN will discard the Authentication Response from the UE.

SUMMARY

It is an objective of the present invention to alleviate a problem with the prior art discussed above.

A first aspect is a method for a femtocell base station, for facilitating communication between a communication terminal and a core network. The method comprises the steps, performed in the femtocell base station, of: sending a first femtocell base station message to the communication terminal; receiving a first terminal message from the communication terminal, the first terminal message comprising a first sequence number; and repeatedly sending further femtocell base station messages to the communication terminal and receiving corresponding terminal messages, comprising incremented sequence numbers, from the communication terminal, such that an expected next terminal message from the communication terminal comprises a sequence number being equal to the first sequence number.

In this way, the femtocell base station forces the communication terminal to increment the sequence number until the next sequence number is the same as the first sequence number received in the communication between the femtocell base station and the communication terminal. Since the sequence numbers are meant to be used in communication between the communication terminal and the core network, this method forces the next sequence number to be what the core network expects it to be. In this way, the effect of the first femtocell base station message and the first terminal message on sequence numbers is neutralised and communication between the communication terminal and the core network can continue as if no sequence number increments had occurred without the knowledge of the core network.

The further messages may be of the same type as the message sent to the communication terminal to cause the communication terminal to respond with the first terminal message.

The method may further comprise the step, prior to the step of sending a first femtocell base station message, of: receiving a message from the communication terminal to initialise communication between the communication terminal and the core network via the femtocell base station.

The message from the communication terminal to initialise communication may be a Radio Resource Control initial direct transfer message.

The method may further comprise the step, after the step of repeatedly sending further messages to the communication terminal and receiving corresponding messages from the communication terminal, of: sending a message to a femtocell base station gateway to request connection establishment for the communication terminal.

The first terminal message and the corresponding messages from the communication terminal may be NAS, Non-Access Stratum, messages.

The further messages and corresponding messages from the communication terminal may be dummy messages with a main purpose to increment the sequence number generation of the communication terminal.

The first message and the further messages may be messages to obtain an identity of the communication terminal. This can for example be used to verify access rights for a communication terminal which attempts to for example register with the CN using the femtocell base station.

The identity may be an IMSI, International Mobile Subscriber Identity.

In the step of repeatedly sending further messages to the communication terminal and receiving corresponding terminal messages from the communication terminal, the number of further messages and corresponding terminal messages may be equal to the number of possible sequence numbers minus one, respectively.

In the step of repeatedly sending further messages to the communication terminal and receiving corresponding terminal messages from the communication terminal, the number of further messages and corresponding terminal messages may be equal to three, respectively.

A second aspect is a femtocell base station for facilitating communication between a communication terminal and a core network. The femtocell base station comprises: a transmitter arranged to send a first femtocell base station message to the communication terminal; a receiver arranged to receive a first terminal message from the communication terminal, the first terminal message comprising a first sequence number; and a controller arranged to, using the transmitter and receiver, repeatedly send further femtocell base station messages to the communication terminal and receiving corresponding terminal messages, comprising incremented sequence numbers, from the communication terminal, such that an expected next terminal message from the communication terminal comprises a sequence number being equal to the first sequence number.

The transmitter and receiver may be combined in a transceiver.

A third aspect is a computer program for facilitating communication between a communication terminal and a core network. The computer program comprises computer program code which, when run in a femtocell base station, causes the femtocell base station to: send a first femtocell base station message to the communication terminal; receive a first terminal message from the communication terminal, the first terminal message comprising a first sequence number; and repeatedly send further femtocell base station messages to the communication terminal and receive corresponding terminal messages comprising incremented sequence numbers from the communication terminal, such that an expected next terminal message from the communication terminal comprises a sequence number being equal to the first sequence number.

A fourth aspect is a computer program product comprising a computer program according to the third aspect and a computer readable means on which the computer program is stored.

The term femtocell base station is to be interpreted as a base station device allowing access to a mobile communication network for mobile communication terminals within a very small area, such as a home or small business. Another term for a femtocell base station in a W-CDMA network is a Home Node B, abbreviated as HNB. The femtocell base station is connected to the mobile communication network via an IP connection, such as over DSL (Digital Subscriber Line), a cable TV IP network or a Metropolitan Area Network.

The term user equipment, UE, is equivalent to communication terminal.

Discussions above and below, e.g. containing features, relating to any one of the aspects of the invention are also, in applicable parts, relevant to any of the other aspects of the present invention.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Terms such as first, second, third, etc. are only descriptive terms and are not to be interpreted to have any order in relation to each other or other entities unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Abbreviations:
3GPP: 3rd Generation Partnership Project
CN: Core Network
CS Circuit Switched
CSG: Closed Subscriber Group
DSL: Digital Subscriber Line
GSM: Global System for Mobile Communications
HMS: HNB Management System
HNB: Home Node B
HNB GW: Home Node B Gateway
IMSI: International Mobile Subscriber Identity
L-GW: Local Gateway
LTE: Long Term Evolution
LU: Location Updating
MSC: Mobile Services Switching Centre
NAS: Non-Access Stratum
RAN: Radio Access Network
RANAP: Radio Access Network Application Part
RNC: Radio Network Controller
RR Radio Resource
RRC: Radio Resource Control SCCP Signaling Connection Control Part
SeGW: Security Gateway
UE: User Equipment, equivalent to communication terminal
UTRA Universal Terrestrial Radio Access
UTRAN: Universal Terrestrial Radio Access Network
W-CDMA: Wideband Code Division Multiple Access The mobile communication network described herein can comply with the W-CDMA standards of 3GPP or any other applicable standard such as LTE, GSM, etc. Hereinafter, references are on occasion made to messages according to W-CDMA for completeness sake, but it is to be noted that this does not restrict the embodiments, which can be applied to any suitable standard where resynchronisation of sequence numbers are desired.

The HNB is an example of a radio base station of UTRA radio access technology and being customer premise equipment, and arranged for serving a femtocell. The present invention may also be relevant to other communication terminals and/or home radio base station working according to other types of radio access technologies of which GSM, CDMA 2000 and LTE are examples. The HNB is thus an example of a femtocell base station.

The discussion herein is mainly directed to wireless communication. However, the present invention may also be relevant to wired communication.

Figure 1:
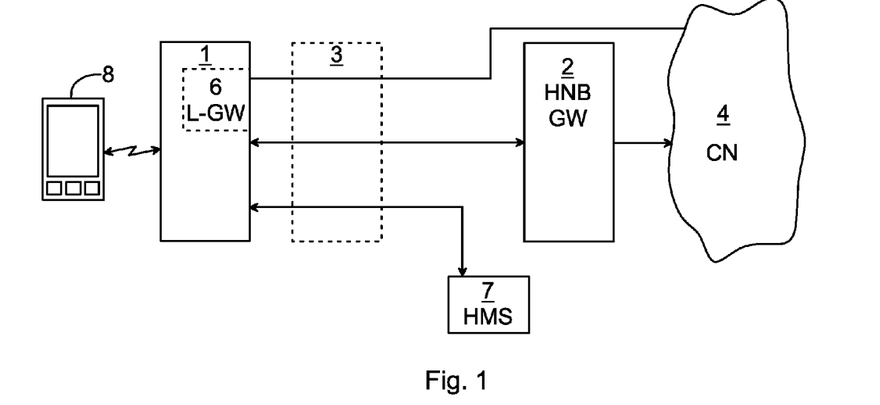
FIG. 1 is a schematic diagram illustrating a system implementing a UE and HNB access network reference model.

The standard specification with number 3GPP TS 25.467 v 10.2.0 describes the UTRAN architecture for femtocell for 3G HNB 1. The overall architecture is shown in FIG. 1 (which is equivalent to figure 4.1-1 from the standard specification).

The HNB 1 is an example of a femtocell base station, being a piece of customer premise equipment that offers the Uu Interface to the UE (e.g. a mobile communication terminal). Furthermore, the HNB 1 provides RAN connectivity using the Iuh interface, supports RNC like functions and supports HNB registration and UE registration over Iuh. The Iuh interface is provided between the HNB 1 and the HNB gateway 2.

A SeGW 3 terminates secure tunnelling for TR-069 (HNB Operation and Maintenance) as well as Iuh. Moreover, the SeGW 3 provides authentication of the HNB 1 and provides the HNB 1 with access to an HMS 7 and HNB GW 2.

The HNB GW 2 terminates the Iuh interface from the HNB 1 and appears as an RNC to the existing CN using existing Iu interface. This means that the HNB GW 2 may be connected to for example an MSC, SGSN (Serving GPRS, General Packet Radio Service, Support Node) or GGSN (Gateway GPRS Support Node) in the CN.

Moreover, the HNB GW 2 supports HNB registration and UE registration over Iuh. The HNB GW 2 is an example of a femtocell base station gateway.

An optional L-GW 6 may be present when the HNB 1 supports Local IP (Internet Protocol) Access (LIPA) functionality. When present, it is co-located with the HNB 1 in the 3GPP Rel-10 specifications.

The HMS 7 can be based on TR-069 family of standards.

Figure 2:
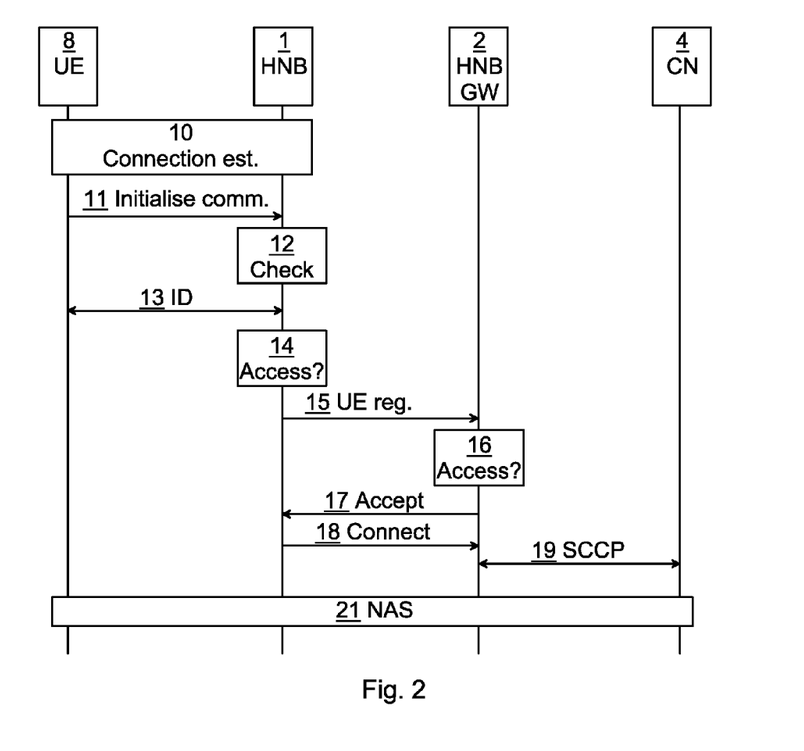
FIG. 2 is a sequence diagram illustrating UE Registration that can performed in the system of FIG. 1.

FIG. 2 is a sequence diagram illustrating UE Registration that can performed in the system of FIG. 1. This is performed when the UE 8 registers with the HNB 1. Initially, the actual connection between the UE 8 and the HNB 1 is established 10.

The UE 8 then initialises communication 11, e.g. by sending a message in the form of an RRC Initial Direct Transfer message (e.g. a location update request, etc.)

The HNB then checks 12 UE compatible standard release, UE capabilities etc. This allows the HNB to check the UE capabilities provided in previous communication 10, 11 to find out if access control is to be performed in the CN or if the HNB can optionally perform the access control. If access control is performed by the CN then there is no need for the HNB to fetch 13 the permanent identity of the subscriber using the UE 8.

Sometimes a permanent identity of the subscriber using the UE 8 or the UE 8 itself is required to check access. This is provided 13 through a femtocell base station message from the HNB 1 to the UE 8 and a corresponding terminal message to the HNB 1, e.g. including an IMSI as an identifier. This is implemented using NAS messages, whereby the UE 8 increments a sequence number N(SD) and includes this sequence number in the terminal message.

The HNB 1 then optionally performs 14 an access control or membership verification e.g. using the IMSI as the identity of the subscriber using UE 8.

If the access control is successful, the HNB 1 sends a UE registration message 15 to the HNB GW 2. The UE registration message 15 can for example include the subscriber identity, UE compatible standard release, UE capabilities, etc.

The HNB GW 2 then performs 16 another access control or membership verification, as prescribed in the standard documents.

If all the access controls are clear, the HNB GW 2 sends 17 a UE registration accept message, including context ID, etc. to the HNB 1.

The HNB 1 then responds 18 with a connect message to the HNB GW 2, which sets up SCCP communication 19 with the CN 4. After that, further NAS communication 21 may occur between the CN 4 and the UE 8, via the HNB 1 and the HNB GW 2. As explained above, this procedure has issues, since a NAS sequence number was incremented by the UE 8 in the identity retrieval 13 between the HNB 1 and the UE 8. This creates a discrepancy in sequence number between the UE 8 and the CN 4, which may result in messages being dropped and/or needing to be resent, with decreased performance as a result. However, a solution to this issue is illustrated in the sequence diagram of FIG. 3.

Figure 3:
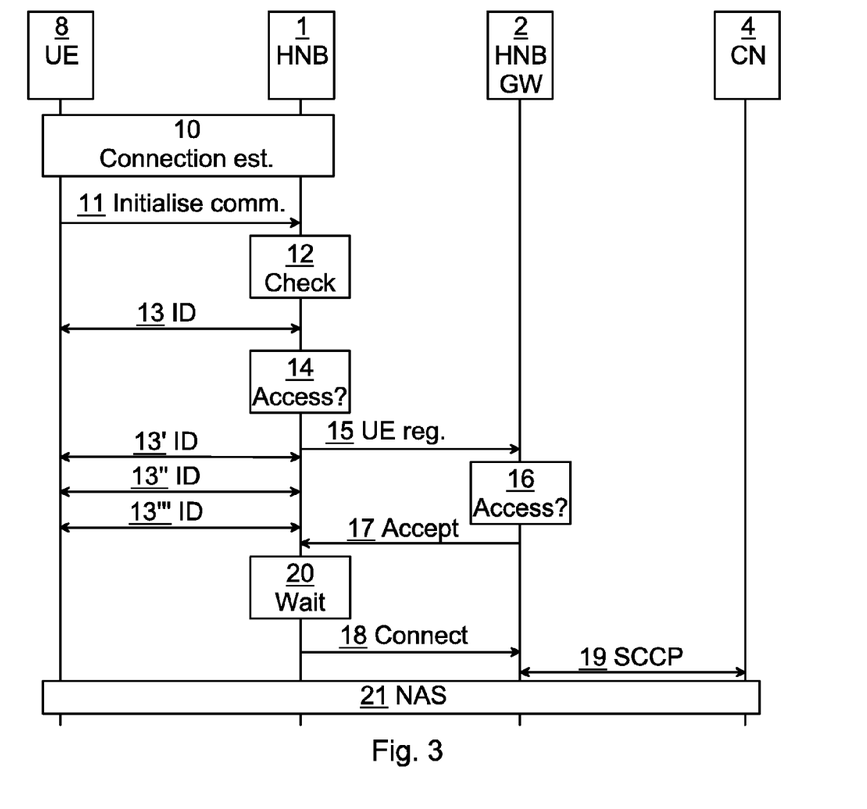
FIG. 3 is a sequence diagram illustrating sending additional messages to prevent sequence number mismatch that can be performed in the system of FIG. 1.

FIG. 3 is a sequence diagram illustrating sending additional messages to prevent sequence number mismatch that can be performed in the system of FIG. 1. Most communication shown in FIG. 3 is identical to the communication of FIG. 2, however, there are additional messages 13', 13", 13''', exchanged between the HNB 1 and the UE 8. The messages 13', 13", 13''' here include three further femtocell base station messages and three corresponding terminal messages. In this way, the sequence number is incremented a further three times. With all the NAS communication 13, 13', 13", 13''' between the HNB 1 and the UE 8, the sequence number has been incremented four times. This number is equal to the number of possible sequence numbers according to the standard, i.e. four (two bits) in this situation.

In this way, the next sequence number to be sent in a NAS message from the UE 8 is the same sequence number that was sent in the first identity check 13. This compensates for the NAS communication 13 between the UE 8 and the HNB 1, whereby the sequence numbers of the UE 8 and the CN are synchronised after the further NAS messages 13', 13", 13'''. The further NAS messages 13', 13", 13''' can be dummy messages that are only used to increment the sequence number counter of the UE 8. For example, the further NAS messages 13', 13", 13''' can be of the same type as used for the identity check 13.

Here, after receiving the UE registration accept message 17 from the HNB GW 2, the HNB waits 20 until all further messages 13', 13", 13''' have occurred, such that the sequence numbers are synchronised between the UE 8 and the CN 4. If all further messages 13', 13", 13''' have already occurred at the time the HNB receives the UE registration accept message 17, there is no need to wait. Hence, only after the further messages 13', 13", 13''' have occurred does the HNB proceed with the connect message to the HNB GW 2, after which the procedure can continue.

Here now follows another description in relation to the registration procedure.

The specification 3GPP TS 25.467 describes UE registration function as following (in section 5.1): "The UE Registration Function for HNB provides means for the HNB to convey UE identification data to the HNB GW in order to perform access control or membership verification for the UE in the HNB GW. The UE Registration also informs the HNB GW of the specific HNB where the UE is located."

UE registration is performed by the HNB 1, and the HNB 1 registers a specific UE 8 with the HNB GW 2. The registration is triggered when the UE 8 attempts to access the HNB 1 via an initial NAS message over the Uu interface (e.g., LU Request) and there is no context in the HNB 1 allocated for that UE 8.

The chapter 5.1.2 of that standard describes the case that a HNB registers a UE in the HNB GW when either UE or HNB or both do not belong to a CSG.

In that case the standard describes the option that the HNB 1 may in certain cases fetch the identity of the subscriber before registering the subscriber in the HNB GW with a NAS Identity Request procedure, see step 13 in FIG. 3. This step 13 may be a NAS Identity Request message sent by the HNB 1, and a NAS Identity Response message sent by the UE 8 as a reply, containing the subscriber identity (IMSI).

A problem with the existing solution is that in step 3 of the registration procedure shown in FIG. 3, the HNB uses a NAS message to fetch the identity of the subscriber. However, NAS messages are defined to be exchanged between the CN and the UE, and they are standardized in 3GPP TS 24.008.

As explained above, the NAS messages contain a 'sequence number', N(SD), that allows the Core Network 4 to detect duplicated NAS messages sent by the UE. NAS messages may be duplicated by the Data Link layer in some cases, for example at channel change before the last layer 2 frame has been acknowledged by the peer. The NAS sequence number mechanism is described in 3GPP TS 24.007, chapter 11.2.3.2.3 and subchapters: The first NAS message at or directly after the RR connection establishment is sent by the UE 8 with sequence number '0' (e.g. in step 2 in FIG. 2 the Location Updating (LU) Request is sent with sequence number '0'). The CN 4 will receive this first NAS message with sequence number '0' in the RANAP Initial UE message (step 19 in FIG. 2).

However, when the HNB 1 fetches the subscriber identity with a NAS Identity Request message, then the UE 8 will step the sequence number and reply with a NAS Identity Response with sequence number '1'.

This means that the CN 4 will discard any further NAS message sent by the UE 8 to the CN 4, since the UE 8 will send the next NAS message to the CN 4 with the sequence number '2', however the CN 4 expects the next NAS message with sequence number '1' according to TS 24.007. This means that the Location update in the CN 4 would fail in certain cases, for example if the CN 4 tries to authenticate the subscriber with a NAS Authentication Request, since the CN 4 would discard the Authentication Response from the UE 8.

Note: In this case the sequence number will be a 2-bit number as it is standardized in TS 24.007 for networks following 3GPP R99 or later. A Core network with UTRAN access always has to follow 3GPP R99 or later release.

The detailed procedure of the embodiments to address this problem can be seen in FIG. 3. Embodiments shown herein proposes to address the problem described above by exchanging 3 additional NAS message request/response pairs 13', 13", 13''' between the HNB 1 and the UE 8. Since the sequence number used for NAS signaling is a 2-bit value for networks following 3GPP R99 or later, the value for the next sequence number is always calculated by incrementing the value modulo 4.

Therefore the sending of in total 4 NAS messages from the UE 8 to the HNB 1 would mean that the UE internal counter for the sequence number has reached the same value as it had after sending the first NAS message for the connection establishment.

Ideally the 3 additional NAS messages sent by the UE 8 should not affect the state in the UE 8 and they should be existing NAS messages in order to avoid additional implementation impacts on the UE 8 for easier deployment. In other examples, other numbers of sequence numbers may be possible; however, the same principle can be applied, causing increments to the sequence numbers to resynchronise the sequence numbers between the UE 8 and the CN 4.

Consequently, embodiments shown herein send further messages 13', 13" and 13''' such that a NAS Identity Request message is sent in total 4 times, where the next Request is always sent by the HNB 1 when it has received the identity response for the previous request. Other choices for the 3 additional NAS messages sent by the UE 8 are of course not precluded, another possibility could be for example using 3 times the TMSI reallocation procedure from the HNB 1 (the HNB 1 has received the TMSI in the Location update Request message). However, the TMSI reallocation procedure requires that TMSI and Location area are stored by the UE 8 each time the TMSI Reallocation Command message is received, which gives a disadvantage compared to using 3 times the Identity Request procedure.

If the HNB 1 needs to send the optional Identity Request message (based on the conditions described in TS 25.467, chapter 5.1.2), then it shall send another Identity Request message after it has received the Identity Response from the UE 8. The HNB 1 shall repeat this procedure until it has received the Identity Response four times from the UE 8. This may happen in parallel to the Registration procedure in the HNB Gateway (steps 15-17 in FIG. 3).

Only when the HNB 1 has received the 4th NAS Identity Response message from the UE 8 (and the registration was accepted by the HNB Gateway), then the HNB 1 shall send the Connect message 18 containing the RANAP Initial UE message to the HNB GW 2.

This will assure that the UE 8 and the CN 4 are aligned with respect to the NAS sequence number to be used when the CN 4 receives the RANAP Initial UE message containing the first NAS message (for example LU request).

An advantage of the presented solution is that it does not affect the CS core network 4. So with the present embodiment, the 3G HNB solution can be deployed in any existing 3G CS core network 4 without updating the MSC nodes in the network.

The presented solution also does not require new implementation in the mobile terminal 8, since it can use existing NAS messages.

Figure 4:
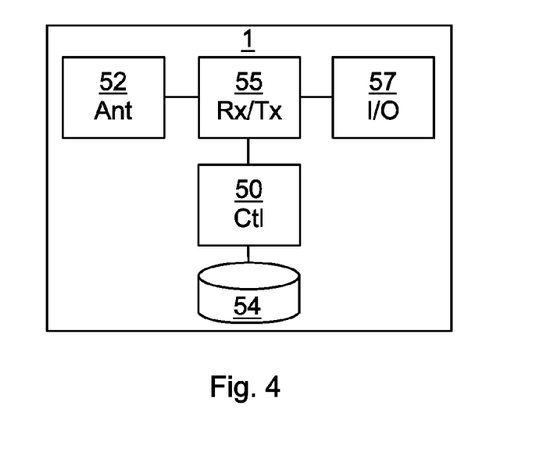
FIG. 4 is a schematic diagram of a HNB of FIG. 1, FIG. 5A-B are flow charts illustrating methods corresponding to the sequence diagram of FIG. 3.

FIG. 4 is a schematic diagram showing some components of a HNB 1 such as any one of the HNBs shown in FIGS. 1-3. A controller 50 is provided using any suitable central processing unit (CPU), microcontroller, digital signal processor (DSP), application specific integrated circuit etc., capable of executing software instructions stored in a computer program product 54, e.g. in the form of a memory. The computer program product 54 can be a memory or any combination of read and write memory (RAM) and read only memory (ROM). The memory also comprises persistent storage, which, for example, can be any single one or combination of magnetic memory, optical memory, solid state memory or even remotely mounted memory.

The HNB 1 also comprises an I/O interface 57 for communicating with the HNB GW using the security gateway over the Iuh interface, and optionally with other HNBs over the Iurh interface.

The I/O interface 57 implements a communication interface unit and is responsible for the implementation internet protocol (IP) interfaces. The controller, or control unit, 50 implements higher protocol layers and other control, such as Iuh, Iurh and Uu interfaces.

The HNB 1 also comprises one or more transceivers 55 and a corresponding number of antennas 52 for radio communication with mobile communication terminals over the Uu interface.

The HNB 1 may be a separate device or it can be combined with a DSL modem, Ethernet switch and/or WiFi access point.

Figure 5A:
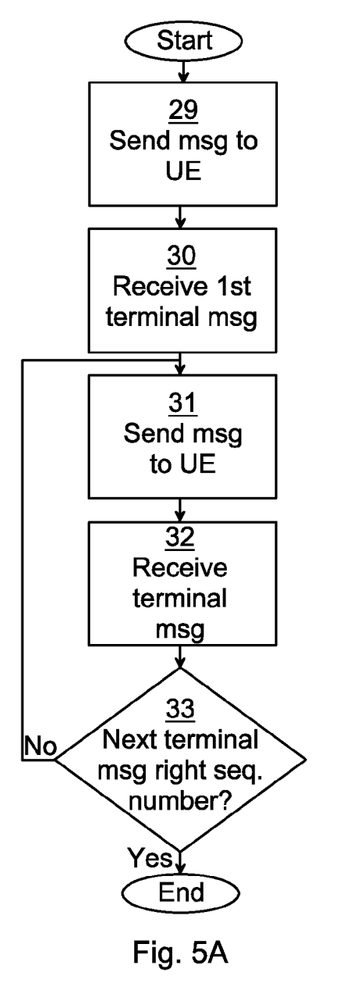

FIG. 5A is a flow chart illustrating a method corresponding to the sequence diagram of FIG. 3. The method is performed in the HNB 1, also known as a femtocell base station, for facilitating communication between the UE 8 and the CN 4.

In a send message to UE step 29, the identity request message is sent from the HNB 1 to the UE 8. A response to this request is received in a receive first terminal message step 30, containing the identity of the UE 8, e.g. in the form of an IMSI. These two steps 29, 30 correspond to communication 13 of FIG. 3.

In a send message to the UE step 31, a further message is sent from the HNB 1 to the UE 8. This message can be a dummy message and the main purpose can be to increment a NAS sequence number in the UE 8. A corresponding response is received in the receive terminal message 32, comprising the incremented sequence number. These two steps 31, 32 correspond to the communication 13', 13", 13''' of FIG. 3.

In a conditional next terminal message right sequence number step 33, it is determined whether an expected next terminal message from the communication terminal would comprise the right sequence number, being the same sequence number as the sequence number received in the receive first terminal message step 30. This determination can be e.g. performed by simply counting the number of further messages sent, or by examining the sequence number contained in the received terminal message in the receive terminal message step 32. In the second example, the next expected sequence number is simply an increment from the most recently received sequence number, modulo the number of possible sequence numbers, e.g. modulo 4.

If it is determined that the expected next terminal message from the communication terminal would comprise the right sequence number, the method ends. Otherwise, the method returns to the send message to UE step 31.

Figure 5B:
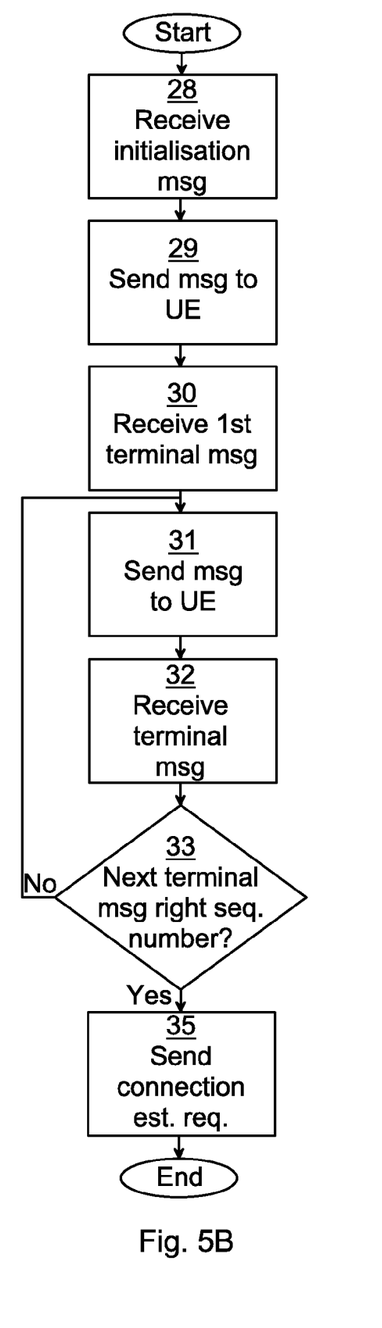

FIG. 5B is a flow chart illustrating another embodiment of a method corresponding to the sequence diagram of FIG. 3. All the steps of FIG. 5A also occur here and will not be explained again.

Here, however, the method starts with a receive initialisation message 28, corresponding to the initialise communication 11 of FIG. 3, to establish communication between the UE and the CN via the HNB.

Furthermore, when the conditional step 33 has an affirmative result, the method here continues to a send connection establishment request step 35. In the send connection establishment request step 35, a RANAP User Adaption (RUA) connect message is sent to the HNB GW 2, corresponding to communication 18 of FIG. 3. This message contains the RANAP Initial UE message that then contains initialisation message, being the first NAS message from the UE, which is received in the receive initialisation message step 28.

Figure 6:
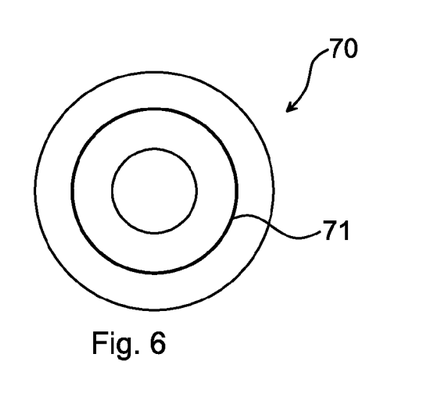
FIG. 6 shows one example of a computer program product comprising computer readable means.

FIG. 6 shows one example of a computer program product 70 comprising computer readable means. On this computer readable means a computer program 71 can be stored, which computer program 71 can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 54 of the HNB 1. While the computer program 71 is here schematically shown as a track on the depicted optical disk, the computer program can be stored in any way which is suitable for the computer program product.

While the embodiments described herein relate to resynchronising sequence numbers of messages due to communication between the HNB and the UE during registration, the same procedure is applicable to other occasions when the HNB would need to communicate with the UE without the knowledge of the CN, where the sequence number is incremented for messages from the UE.

It will now be presented embodiments from a complementary perspective.

According to one embodiment, there is provided a method of a femtocell base station, for facilitating communication between a communication terminal, such as a mobile communication terminal, and a core network. The method comprises the steps, performed in the femtocell base station, of: sending a first message to the communication terminal; receiving a first response to the first message from the communication terminal, the first response comprising a first sequence number; and repeatedly sending further messages to the communication terminal and receiving corresponding responses from the communication terminal, such that an expected subsequent response from the communication terminal comprises sequence number being equal to the first sequence number.

The method may comprise the step, prior to the step of sending a first message, of receiving a message from the communication terminal to initialise communication for the communication terminal via the femtocell base station.

The message from the communication terminal to initialise communication for the communication terminal via the femtocell base station may be a Radio Resource Control initial direct transfer message.

The method may comprise the step, after the step of repeatedly sending further messages to the communication terminal and receiving corresponding responses from the communication terminal, of sending a message to a femtocell base station gateway to register the communication terminal with the femtocell base station.

The first response and the corresponding responses may be NAS, Non-Access Stratum, messages.

The further messages and corresponding responses may be dummy messages with a main purpose to increment the sequence number generation of the communication terminal.

The further messages may be of the same type as the first message.

The first message and the further messages may be messages to obtain an identity of the communication terminal. The identity may be an IMSI, International Mobile Subscriber Identity.

In the step of repeatedly sending further messages to the communication terminal and receiving corresponding responses from the communication terminal, the number of further messages and corresponding responses may be equal to the number of possible sequence numbers minus one.

In the step of repeatedly sending further messages to the communication terminal and receiving corresponding responses from the communication terminal, the number of further messages and corresponding responses may be equal to three.

Another embodiment of the invention is a femtocell base station for facilitating communication between a communication terminal, such as a mobile communication terminal, and a core network. The femtocell base station comprises: a transmitter arranged to send a first message to the communication terminal; a receiver arranged to receive a first response to the first message from the communication terminal, the first response comprising a first sequence number; and a controller arranged to, using the transmitter and receiver, repeatedly send further messages to the communication terminal and receiving corresponding responses from the communication terminal, such that an expected subsequent response from the communication terminal comprises sequence number being equal to the first sequence number.

The transmitter and receiver may be combined in a transceiver.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a femtocell base station for facilitating communication between a communication terminal and a core network, the method comprising:
   sending a first femtocell base station message to the communication terminal;
   receiving a first terminal message from the communication terminal in response, the first terminal message including a first sequence number; and
   repeatedly sending one or more further femtocell base station messages to the communication terminal and receiving in response corresponding terminal messages that include incremented sequence numbers, until the next terminal message that would be expected from the communication terminal in response to sending another further femtocell base station message would include a sequence number equal to the first sequence number.

2. The method according to claim 1, wherein the further femtocell base station messages are of the same type as the first femtocell base station message.

3. The method according to claim 1, wherein sending the first femtocell base station message comprises sending the first femtocell base station message responsive to receiving a message from the communication terminal to initialise communication between the communication terminal and the core network via the femtocell base station.

4. The method according to claim 3, wherein the message from the communication terminal to initialise communication is a Radio Resource Control initial direct transfer message.

5. The method according to claim 1, further comprising, after repeatedly sending further messages to the communication terminal and receiving corresponding messages from the communication terminal, sending a message to a femtocell base station gateway to request connection establishment for the communication terminal.

6. The method according to claim 1, wherein the first terminal message and the corresponding messages from the communication terminal are Non-Access Stratum messages.

7. The method according to claim 1, wherein the further messages are dummy messages sent solely, or at least primarily, to increment sequence number generation of the communication terminal.

8. The method according to claim 1, wherein the first message and the further messages each request an identity of the communication terminal.

9. The method according to claim 8, wherein the identity is an International Mobile Subscriber Identity.

10. The method according to claim 1, wherein said repeatedly sending comprises sending a number of further femtocell base station messages equal to a number of possible sequence numbers minus one.

11. The method according to claim 1, wherein said repeatedly sending comprises sending three further femtocell base station messages.

12. A femtocell base station for facilitating communication between a communication terminal and a core network, the femtocell base station comprising:
   a transmitter;
   a receiver; and
   a controller configured, via the transmitter and receiver, to:
      send a first femtocell base station message to the communication terminal;
      receive a first terminal message from the communication terminal in response, the first terminal message including a first sequence number; and
      repeatedly send one or more further femtocell base station messages to the communication terminal and receive corresponding terminal messages that include incremented sequence numbers, until the next terminal message that would be expected from the communication terminal in response to sending another further femtocell base station message would include a sequence number equal to the first sequence number.

13. The femtocell base station according to claim 12, wherein the transmitter and receiver are combined in a transceiver.

14. The femtocell base station according to claim 12, wherein the further femtocell base station messages are of the same type as the first femtocell base station message.

15. The femtocell base station according to claim 12, wherein the controller is configured to send the first femtocell base station message responsive to receiving a message from the communication terminal to initialise communication between the communication terminal and the core network via the femtocell base station.

16. The femtocell base station according to claim 15, wherein the message from the communication terminal to initialise communication is a Radio Resource Control initial direct transfer message.

17. The femtocell base station according to claim 12, wherein the controller is configured, after repeatedly sending further messages to the communication terminal and receiving corresponding messages from the communication terminal, to send a message to a femtocell base station gateway to request connection establishment for the communication terminal.

18. The femtocell base station according to claim 12, wherein the first terminal message and the corresponding messages from the communication terminal are Non-Access Stratum messages.

19. The femtocell base station according to claim 12, wherein the further messages are dummy messages sent solely, or at least primarily, to increment sequence number generation of the communication terminal.

20. A computer program product stored on a computer readable medium and comprising computer program code that, when run by one or more processing circuits of a femtocell base station, causes the femtocell base station to facilitate communication between a communication terminal and a core network, wherein the computer program code causes the femtocell base station to:
- send a first femtocell base station message to the communication terminal;
- determine that a first terminal message received from the communication terminal in response includes a first sequence number; and
- repeatedly send one or more further femtocell base station messages to the communication terminal and receive in response corresponding terminal messages that include incremented sequence, until the next terminal message that would be expected from the communication terminal in response to sending another further femtocell base station message would include a sequence number equal to the first sequence number.

* * * * *